US011937704B2

(12) United States Patent
Dorshorst

(10) Patent No.: US 11,937,704 B2
(45) Date of Patent: *Mar. 26, 2024

(54) MATTRESS AIR SUPPLY

(71) Applicant: Medline Industries, LP, Northfield, IL (US)

(72) Inventor: Christine Dorshorst, Kildeer, IL (US)

(73) Assignee: Medline Industries, LP, Northfield, IL (US)

( * ) Notice: Subject to any disclaimer, the term of this patent is extended or adjusted under 35 U.S.C. 154(b) by 157 days.

This patent is subject to a terminal disclaimer.

(21) Appl. No.: 17/528,357

(22) Filed: Nov. 17, 2021

(65) Prior Publication Data

US 2022/0071406 A1 Mar. 10, 2022

Related U.S. Application Data

(63) Continuation of application No. 16/609,358, filed as application No. PCT/US2017/046257 on Aug. 10, 2017, now Pat. No. 11,206,928.

(60) Provisional application No. 62/399,720, filed on Sep. 26, 2016.

(51) Int. Cl.

| | |
|---|---|
| ***A47C 27/08*** | (2006.01) |
| ***A61G 7/057*** | (2006.01) |
| ***A61G 7/10*** | (2006.01) |

(52) U.S. Cl.

CPC ........ *A47C 27/083* (2013.01); *A61G 7/05761* (2013.01); *A61G 7/05776* (2013.01); *A61G 7/1021* (2013.01); *A61G 7/1028* (2013.01); *A61G 7/05784* (2016.11)

(58) Field of Classification Search

USPC .............................................................. 5/714

See application file for complete search history.

(56) References Cited

U.S. PATENT DOCUMENTS

| | | | | |
|---|---|---|---|---|
| 6,073,291 | A * | 6/2000 | Davis | A61G 7/05784 414/676 |
| 7,735,164 | B1 * | 6/2010 | Patrick | A61G 7/1026 5/713 |
| 11,206,928 | B2 * | 12/2021 | Dorshorst | A61G 7/05776 |
| 2003/0221261 | A1 * | 12/2003 | Torbet | A47C 27/082 5/709 |

FOREIGN PATENT DOCUMENTS

EP 0620716 B1 * 3/1998 ........... A47C 27/081

* cited by examiner

*Primary Examiner* — Justin C Mikowski
*Assistant Examiner* — Adam C Ortiz
(74) *Attorney, Agent, or Firm* — Fitch, Even, Tabin & Flannery LLP

(57) ABSTRACT

An air supply supplies air to multiple different inflatable devices. The air supply includes an air compressing device, and at least two pressure valves. The air supply operates to introduce air from the first pressure valve to a first inflatable device at a first pressure that is within a first air pressure range. The air supply also operates to introduce air, on demand, from the second pressure valve to a second inflatable device at a second pressure within a second air pressure range while continuing to supply air to the first inflatable device at a pressure within the first air pressure range. The second pressure and/or the second pressure range is different from the first pressure and/or the first pressure range.

12 Claims, 4 Drawing Sheets

MATTRESS AIR SUPPLY

This application is a continuation of U.S. patent application Ser. No. 16/609,328, filed on Sep. 29, 2019, which is a U.S. national phase application filed under 35 U.S.C. § 371 of International Application Number PCT/US2017/046257, filed Aug. 10, 2017, designating the United States, which claims priority to U.S. Provisional Application No. 62/399,720, filed on Sep. 26, 2016, which are hereby fully incorporated by reference as if fully set forth herein.

TECHNICAL FIELD

This application relates to air supplies for inflatable devices, and related methods of operation. More particularly, this application relates to air supplies capable of simultaneously providing air to two separate air mattresses.

BACKGROUND

Therapy air mattresses are designed to hold patients that may not be capable of moving for extended periods of time. To limit or control the distribution of pressure points on the mattress, which can cause bed sores in patients, therapy air mattresses may use air instead of springs. To keep the mattress cool, breathable, and comfortable (among other benefits), therapy mattresses may include holes in the top surface that slowly leak air in a controlled manner. Therapy mattresses may be connected to a steady air supply, such as a pump or blower assembly, to provide air at a steady volumetric flow rate and/or to maintain a generally consistent internal air mattress pressure and a steady emission of air through the holes.

Patient transfer mattresses are used to facilitate transferring patients from one location to another, for example, from a hospital bed to a gurney. Some patient transfer mattresses include holes on the bottom surface that release air to form an air cushion between the patient transfer mattress and the surface it rests upon. This cushion reduces the force of friction between the mattress and the resting surface, and thus facilitating movement of a patient from one location to another. To maintain the air cushion and to keep the mattress sufficiently inflated when in use, patient transfer mattresses also are connected to an air supply. After use, patient transfer mattresses can be removed from the air supply and return to a deflated state until such time that they are to be used again.

Patient transfer mattresses can be used to transfer patients that are resting on a therapy mattress. In these instances, to sufficiently supply the air to operate the mattresses, each mattress utilizes a separate air supply that is designed to meet the particular air pressure and/or flow rate demands of the particular mattress. Each air supply may have its own housing, power cords, supply hose, and other equipment that can add clutter to the patient's environment.

DESCRIPTION

Figure 1:
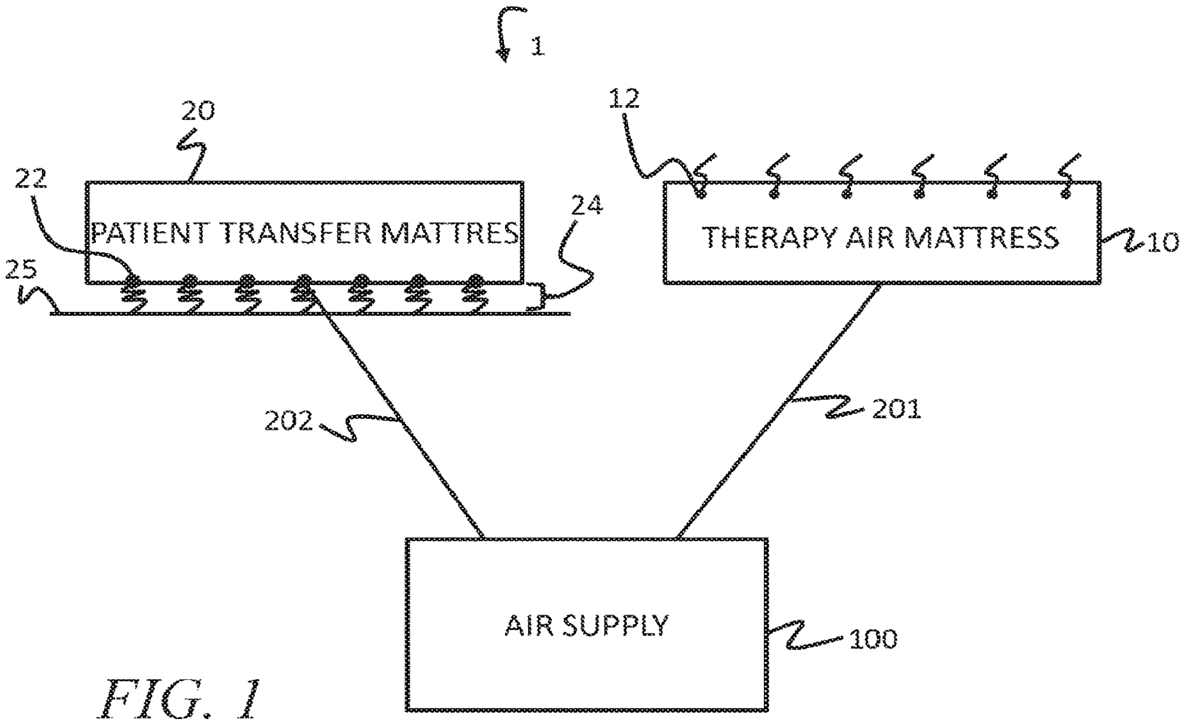
FIG. 1 is a system block diagram of an air mattress system in accordance with examples described in this application.

This application describes variations of an air supply, and related systems and methods, for supplying air to multiple different inflatable devices. The air supply includes an air compressing device, and at least two pressure valves. The air supply is operable to introduce air from a pressure valve to a first inflatable device at a first pressure, or at a first volumetric flow rate, that is within a first air pressure range or flow rate range. The air supply also operates to introduce air, on demand, from the second pressure valve to a second inflatable device. The air supply is able to introduce air to the second inflatable device at a second pressure or flow rate that is within a second air pressure range or flow rate range while continuing to supply air to the first inflatable device at the first pressure or flow rate within the first pressure or low rate range. The air supply is able to operate in this manner even when the second pressure or flow rate is different from the first pressure or flow rate.

Many of the examples described herein refer to air supplies that are able to control the pressure level at which air is supplied to various inflatable devices. It should be appreciated that in some aspects, depending on the demands of the mattress, the air supply may also or instead be able to functionally control the volumetric flow rate of air supplied to the inflatable devices. Further, in some situations, the air supply may be able to control the air pressure levels supplied to one device (e.g., a patient transfer mattress) without respect to volumetric flow rate, while at the same time being able to control the volumetric flow rate supplied to another device (e.g., a therapy mattress) without respect to the air pressure level. In some instances, for example, where the operating parameters of the flow paths from the air supply (e.g., the flow path diameters, flow path length, valve positions in the flow path, etc.) remain unchanged, the control of the volumetric flow rate may be related to the control of the air pressure levels supplied, and vice versa.

The separate inflatable devices may include two different air mattress that each inflate according to different parameters. For example, the different air mattresses may require different air pressure levels and/or flow rates to inflate and/or to perform certain functionality. For example, a first inflatable device may include a low air loss therapy air mattress that steadily releases air through small holes in the mattress top. Such a therapy air mattress can be used as a bariatric air mattress or for other functionality. The specific pressure level and/or flow rate to keep a therapy air mattress inflated while steadily releasing air can vary depending on a variety of factors, such as the size of the therapy air mattress, the weight of the patient on the therapy air mattress, the amount of air holes on the therapy air mattress, and the desired mattress firmness level, among other factors. Accordingly, the air supply may be tailored to supply air at a predetermined volumetric flow rate, or within a predetermined flow rate range, to accommodate the desired operating parameters of the particular therapy air mattress. For example, the air supply may be tailored to supply air to a therapy air mattress at a volumetric flow rate between about at about 8 liters per minute, about 100 liters per minute, at about 150 liters per minute, depending on the particular mattress. In some instances, the air supply may be able to supply air at volumetric flow rates that vary within that range of 8 to 150 liters per minute, or that are greater or less than that range. In some situations, the acceptable tolerance values for flow rate to a particular therapy mattress may be broader or tighter, depending on factors such as the structure of the mattress, patient needs or preferences, and other factors specific to the particular therapy air mattress. When configured to provide plural flow rates, the flow rate for the transfer mattress may be from 2-20 times the flow rate for the therapy mattress; in other embodiments, the multiple may be from 5-20; in other embodiments, the multiple may be from 8-16.

The second inflatable device can include a patient transfer mattress that generates a cushion of air between the mattress and a resting surface. The air supply is capable supplying a steady supply of air to the therapy mattress, so that the therapy mattress can maintain a generally consistent internal air pressure, while simultaneously being able to introduce a second stream of air, on demand (e.g., the second stream can be turned on and off) to the patient transfer mattress at a pressure level (or flow rate) sufficient to generate an air cushion that reduces friction between the patient transfer mattress and a resting surface, such as a bed or gurney. The specific pressure level (or flow rate) to enable a patient transfer mattress to generate an air cushion can vary depending on a variety of factors including, for example, the size and structure of the patient transfer mattress, the friction levels of the resting surface, and the weight of the patient resting on the patient transfer mattress, among other factors. Accordingly, the air supply may be tailored to supply air at a predetermined pressure level, or within a predetermined pressure range, to accommodate the desired operating parameters of the particular patient transfer mattress. For example, the air supply may be tailored to supply air to a patient transfer mattress at an air pressure level that is within a range of about 1 psi to about 20 psi. In some situations, the air pressure range to operate a particular patient transfer mattress may be between about 5 psi and about 15 psi. And in some examples, the air pressure level may be more specifically at about 10 psi, or within a range that is between about 25+/−50% of 10 psi. In some situations, the acceptable pressure range or tolerance value may be broader or tighter, depending on factors such as the structure of the mattress, patient needs or preferences, and other factors specific to the particular patient transfer mattress. Further, in some situations, it may be desired to supply air to a patient transfer mattress at multiple different pressure levels to accommodate varying operating conditions. For example, in a first instance it may be useful to supply air at a low level to accommodate smaller patients such as children, and in a second instance it may be useful to supply air at a higher air pressure level to accommodate larger, heavier patients. Thus, some of the air supplies described herein are capable of supplying air, on demand, at a variety of different pressure levels.

The term "air supply" as used herein refers to a device or system that is capable of introducing air. The air supply may be capable compressing or pumping air, storing air, regulating pressure levels, and/or releasing air through an outlet or conduit. An "air supply" may comprise a blower, inflator, air pump, or air compressor, and may also include additional features. For example, an air supply may include a variety of components that can include air compressors or pumps, air reservoirs or air tanks, valves or flow regulators, conduits (e.g., tubes and/or pipes), outlets or nozzles, switches, control panels or user interfaces, and communication modules (e.g., wireless communication devices that allow for remote operation).

The term "inflatable device" as used herein refers to any device configured to receive air from an air supply and that at least partially inflate. The "inflatable device" may not necessary inflate itself. For example, an inflatable device can include a therapy air mattress (e.g., a low air loss mattress or a bariatric air mattress) or a patient transfer mattress that releases air through ports or holes, but that otherwise may be filled with foam, feathers, cushions, or springs, by way of example. Additionally, the inflatable device mattresses may simply be a mat, pad, or sheet. Nevertheless, because these mattresses receive air from an air supply, and release air through the holes or ports, they are considered "inflatable devices" consistent with the way that term is used in this application.

As seen in FIG. 1, the exemplary system 1 includes an air supply 100 and two inflatable devices. In particular, the system 1 includes therapy air mattress 10 and a patient transfer mattress 20. The system also includes conduits 201 and 202 fluidly connecting the two mattresses 10/20 with the air supply 100.

The therapy mattress 10 is an inflatable device that may be inflated with air. The therapy air mattress 10 includes multiple release ports 12 that release air from the mattress at a controlled rate. These release ports release air for a variety of purposes, including, for example, to keep the mattress and the patient cool and comfortable. Because the therapy air mattress 10 releases air through the ports, the air supply 100 is configured to deliver a steady supply of air to the therapy air mattress 10. This steady supply of air can help maintain a relatively consistent internal air pressure within the therapy air mattress 10. It is contemplated that the supply of air may vary within a predetermined tolerance range.

The patient transfer mattress 20 has multiple cushion ports 22 or nozzles on a bottom surface. These cushion ports 22 are designed to release air at pressure level sufficient to generate an air cushion 24, or to otherwise provide lift to the patient transfer mattress 20. The air cushion 24 or lift is designed to reduce the friction forces between the bottom surface of the patient transfer mattress 20 and the surface 25 that the patient transfer mattress lies upon (e.g., another mattress, a gurney, the ground, etc.). By reducing friction, the air cushion 24 thus facilitates movement of a patient resting on the patient transfer mattress 20.

The air pressure level sufficient to generate the air cushion 24 may be different from the air pressure level that sustains the therapy air mattress 10. However, compared to the therapy air mattress 10, the patient transfer mattress is only designed to operate for relatively short periods of time. That is, the patient transfer mattress will generally only need to operate while the patient is moving from one location to another. Thus, the patient transfer mattress 20 may be deflated and removed from the air supply 100 after the transfer of a patient. The therapy air mattress 10, on the other hand, may frequently need to remain in operation even after the patient is transferred. Accordingly, the air supply 100 is thus configured to supply a steady and/or consistent stream of air to the therapy air mattress 10, while also being able to introduce a second stream of air to the patient transfer mattress 20 on demand without significantly affecting the air supply to the therapy air mattress 10. Again, it is contemplated that the air supply to the mattress may vary within a predetermined range.

The air supply 100 is connected to each of the therapy air mattress 10 and the patient transfer mattress 20 via conduits 201 and 202. Conduit 201 connects the air supply 100 with the therapy air mattress 10, and conduit 202 connects the air supply 100 with the patient transfer mattress 20. The conduits 201/202 may be in the form of tubes, pipes, hoses, or the like. The conduits 201/202 may extend from separate ports from the air supply 100, or they may extend from a connector or adaptor, such as a fork or a Y-splitter in line with the air supply 100. The conduits 201/202 may have a nozzle or other outlet port on one end that is designed to introduce air to the respective mattresses. The conduits 201/202 also include an inlet port on the opposing end that allow for attachment to the air supply 100. In some embodiments, the inlet ports of the conduits 201/202 may be non-removable from the air supply 100. That is, the conduits may be non-removable extensions from the air supply 100. In other embodiments, the conduits 201/202 may be configured to be removably attachable to the air supply 100, for example, via a quick connect fitting or similar engagement. In some formats, the air supply 100 will be configured to activate a second air supply stream to the patient transfer mattress 20 when the conduit 202 is attached to a port of the air supply 100, and to deactivate the second air supply stream when the conduit 202 is detached from the air supply 100.

Figure 2:
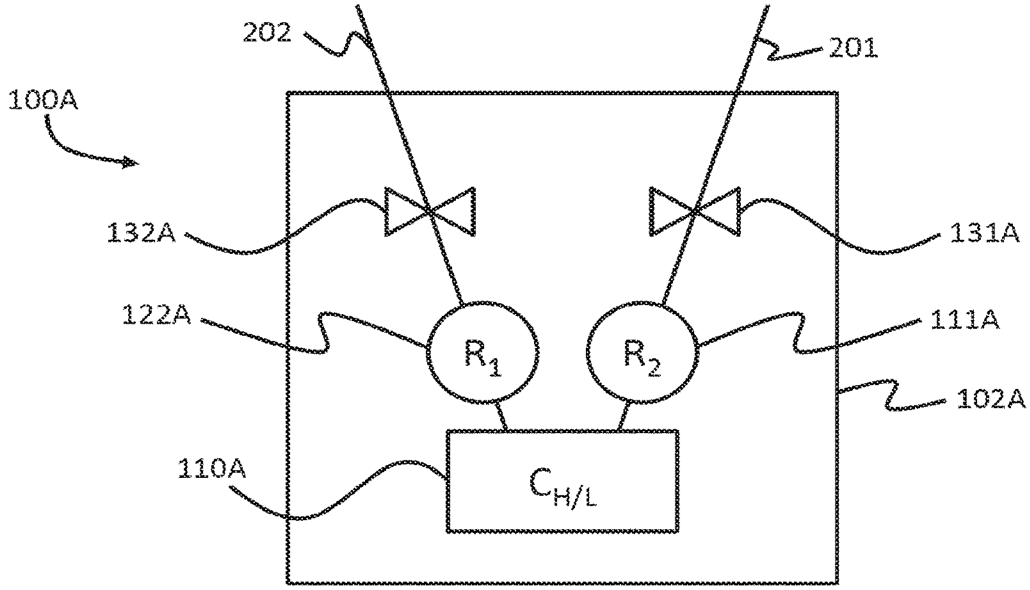
FIG. 2 is a block diagram of an example of an air supply unit that may be used in the mattress system of FIG. 1.

The air supply 100 can take on a variety of configurations, as shown in FIGS. 2-5, and as discussed further below. FIG. 2 shows an example configuration of an air supply 100A that utilizes a multi-speed air compressor 110A. The multi-speed compressor 110A (marked as CH/L to designate a compressor capable of operating at a high and low rate) is in fluid communication with both conduits 201 and 202, and thus is capable of supplying air to both the therapy air mattress 10 and the patient transfer mattress 20. The multi-speed air compressor 110A can be electrically powered, for example, via an AC power outlet or a battery, or it may be powered via other means.

Via one flow path, the compressor 110A communicates with a first reservoir 121A. The compressor 110A communicates with a second reservoir 122A via a second flow path. The reservoirs 121A and 122A, which can be air tanks or air chambers, are configured to receive and store compressed air. As shown in FIG. 2, the two reservoirs are not fluidly connected, so that each reservoir can store air at a different air pressure level. However, in some forms, only a single reservoir may be used, provided that air released from the reservoir can be released at different pressure levels and/or flow rates for each of the two flow paths. In some embodiments, the compressor 110A may deliver air to one or more of conduits 201 and 202 without use of a reservoir. Further, in some examples, the compressor 110A itself may have its own reservoir or air storage tank.

Each reservoir also has an outlet port that leads to the respective conduits, and an intermediary pressure valve 131A/132A therebetween. The pressure valves 131A/132A are configured to control the release of air from the reservoir to the respective conduit lines 201/202. In some examples, the pressure valves 131A/132A are mere on/off valves that either release air from flowing or stop its flow. In other examples, the pressure valves 131A/132A allow for a pressure drop. That is, the pressure valves 131A/132A may release air to the conduits 201/202 at a pressure level different from the pressure level maintained in the respective reservoirs 121A/122A.

As noted above, the multi-speed compressor 110A can operate in a variety of operating speeds or modes, each operating mode configured to compress air at a different rate or to a different pressure level. For example, the compressor 110A can be configured to operate in a first mode (or a low mode) when the air supply 100A is only supplying air to the therapy air mattress 10. The compressor 110A can be activated to operate in a second mode (or a high mode) when the air supply 100A is supplying air to both the therapy air mattress 10 and the patient transfer mattress 20. In operation, the air supply 100A may be operating continuously in a first mode, supplying air to the therapy air mattress 10, either directly from the compressor 110A, or via an air reservoir 121A. In the first mode, the compressor 110A pumps air at an air pressure level sufficient to meet the inflation demands of the therapy air mattress 10. The pressure or flow rate of air delivered to the therapy air mattress 10 may be reduced via the pressure valve 131A, or it may be delivered without pressure or flow rate drop. In response to an activation (e.g., a user activating a switch, plugging in a conduit, opening a valve, executing a command via a user interface, etc.), the compressor 110A may change to operate at a second mode (e.g., a high compression mode). In the second compression mode, the compressor 110A is capable of compressing air to a level sufficient to meet the pressure demands of a patient transfer mattress 20. In the second mode, the pressure valve 131A may initiate a controlled pressure drop, so that the air pressure or flow rate delivered to the therapy air mattress is consistent with the flow rate and/or pressure levels generated in the first mode. Depending on the pressure needs of the patient transfer mattress 20, the pressure valve 132A may also initiate a controlled pressure. In this way, the air supply 100A can simultaneously deliver air through two separate outlets at different pressure levels.

Figure 3:
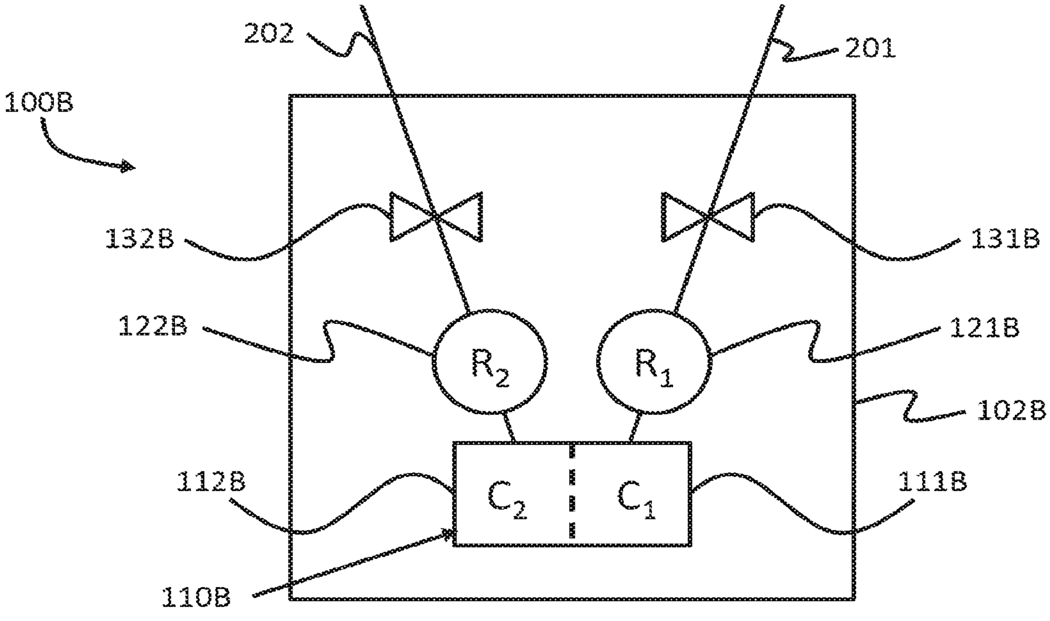
FIG. 3 is a block diagram of a second example of an air supply unit that may be used in the mattress system of FIG. 1.

FIG. 3 shows another example configuration for an air supply 100B that can be used in connection with the system of FIG. 1. In particular, FIG. 3 shows an air supply 100B that utilizes a dual compressor 110E device. That is, the dual compressor device 110E may have two compression units 111B and 112B that are each capable of operating at different compression rates. Each compression unit 111B/112B is fluidly connected to a separate flow path toward the respective conduits 201/201. The flow paths may include reservoirs 121B/122B and pressure valves 131B/132B, but in some embodiments, depending on the particular arrangement and type of use, the reservoirs and pressure valves may not be present. Thus, different from air supply 100A, which utilizes a single compressor 110A that operates at multiple levels, the air supply 100B of FIG. 3 uses separate compressors to meet the multiple pressure and/or flow rate levels.

In operation, the air supply 100B may operate the first compressor unit 111B continuously, thereby supplying air to the therapy air mattress, via conduit 201, at a consistent pressure level or volumetric flow rate. When a user activates the air supply 100B to perform a dual air supply function, which can be accomplished, for example, operating a switch, connecting a conduit to the air supply, by releasing a valve, or by executing functionality via a user interface, the air supply 100B activates the second compressor unit 110E to supply air at a second pressure level and/or volumetric flow rate to the patient transfer mattress 20. Because the second compressor unit 112B can operate at different compression levels from the first compressor unit 111B, the air supply 100B can simultaneously deliver air through two separate outlets at different pressure levels and/or flow rates. When the patient transfer mattress 20 is no longer operating, the air supply 100B can turn off the second compressor unit 110E while continuing to supply air to the therapy air mattress 10.

Figure 4:
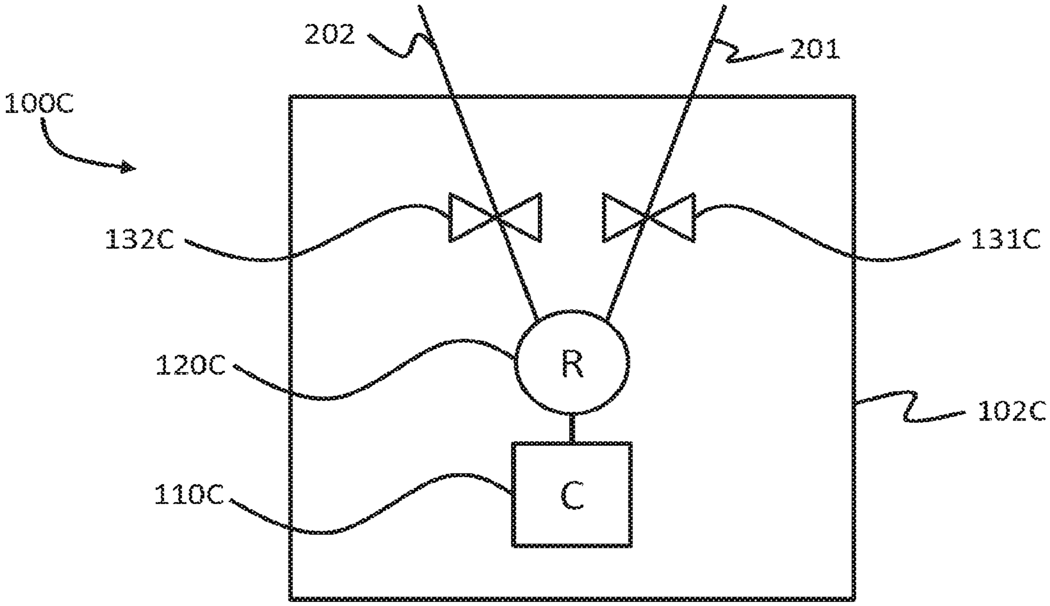
FIG. 4 is a block diagram of a third example of an air supply unit that may be used in the mattress system of FIG. 1.

FIG. 4 shows another example configuration for an air supply 100C that can be used in connection with the system of FIG. 1. FIG. 4 shows an air supply 100C that utilizes a single compressor HOC and a single reservoir 120C. The reservoir 120C has two outlet ports, each of which is in fluid connection with respective conduits 201/202 to the therapy air mattress 10 and the patient transfer mattress 20. A first pressure valve 131C is in communication with the first reservoir outlet, and is capable to control the pressure level released from the air reservoir 120C. For instance, the first pressure valve 131C can control the flow of air from the air reservoir 120C to the therapy air mattress 10 so that the air is sufficient to keep the therapy air mattress 10 at a consistent internal pressure. The second pressure valve 132C similarly controls the flow of air from the air reservoir 120C to the patient transfer mattress 20 via the conduit 202, and is capable of controlling the air pressure to a level sufficient to meet the demands of the patient transfer mattress 20. In some instances, the second pressure valve 132C may not control a pressure drop, and may instead operate as an open/closed gate valve to deliver air at a pressure that is at a level similar to the pressure level of the reservoir 120C.

In operation, the air supply 100C operates the compressor HOC to compress air into the reservoir 120C at a level that is at least as high as the highest pressure level required by the mattress system 1. That is, the air pressure level in the reservoir 120C is at least as high as the air pressure level sufficient to allow the patient transfer mattress 20 to generate an air cushion 24 that reduces friction. The first pressure valve 131C continuously releases air to the therapy air mattress 10 at a consistent air pressure level and/or flow rate so that the internal pressure of the therapy air mattress 10 remains consistent. The pressure valve 131 may utilize a controlled pressure drop or other functionality to assure this consistent pressure level. When a user activates the air supply 100C to perform a dual air supply function, the second pressure valve 132C releases air at a second pressure level to the patient transfer mattress 20. If necessary, the second pressure valve 132C may drop the pressure to a suitable level.

Figure 5:
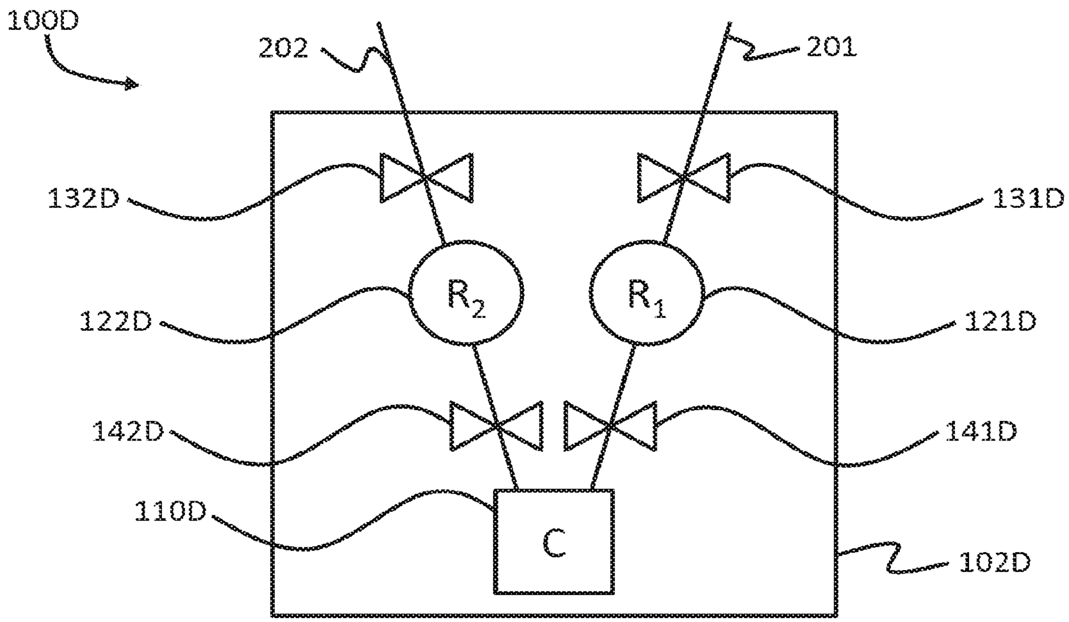
FIG. 5 is a block diagram of a fourth example of an air supply unit that may be used in the mattress system of FIG. 1.

FIG. 5 shows still another example of an air supply 100D that can be used in connection with the system of FIG. 1. FIG. 5 shows an air supply 100D that utilizes a single compressor 110D and two reservoirs 121D and 122D. The reservoirs 121D/122D deliver air, via an outlet and through respective conduits 201/202, to the therapy air mattress 10 and the patient transfer mattress 20. Pressure valves 131D/132D may control the release of air from the reservoirs. In this example, the pressure levels of each reservoir 121D/122D can vary due to the use of additional pressure controls 141D and 142D in line with the flow path between the compressor 110D and the reservoirs 121D/122D. These pressure controls 141D/142D can be valves configured to control the pressure level delivered from the compressor 110D to each respective reservoir 121D/122D, thereby allowing each reservoir to store air at a pressure level sufficient to meet the demands of the respective mattresses that they inflate. The compressor 110D is configured to compress air at a level at least as high as the highest level demanded by the system. For instance, the compressor 110D is capable of compressing air at a level at least as high as the pressure level needed to allow the patient transfer mattress to generate the air cushion 24. In this way, the pressure valves 131D and 132D do not need to drop the pressure levels of air released by the reservoirs 121D/122D (though such a configuration is still possible as a further form of control).

Each of the air supplies 100A-D of FIGS. 2-5 are shown within a housing 100A-D. In the embodiments shown, the air supply units 100A-D have a housing 102A-D that surrounds all of the components of the air supply 100A (including the compressors (110A-D), reservoirs (120A, 121B, 122B, 120C, 121D, and 122D), and the pressure valves (131A-D, 132A-D, 141D, and 142D)). However, in some forms, the housing may enclose only some of the components. For instance, the valves or one or more of the reservoirs may be external to the housing 102. And in some instances, there may be no housing, such that the air supply 100A-D is formed from multiple separate components.

The housings 102A-D can be configured to attach to a bed or a wall so as to make more room for floor space around the therapy air mattress 10. The housings 102A-D may also include a power supply, such as a battery hookup or an AC power cord extending therefrom. The housings 102A-D may further include various switches, controls, and/or interfaces that control operation of the air supply 100A-D. For instance, the housings 102A-D may include a user interface that allows a user to toggle back and forth between operation in a first state (e.g., a state that supplies air only a steady stream of air to a first inflatable device) and a second state (e.g., a state that supplies both a steady stream of air to a first inflatable devoice, and a second stream of air that supplies air to a second inflatable device). Further, the housings 102A-D may include ports or adapters that allow various conduits (e.g., conduits 201 and 202) to establish a fluid connection to the air supply 100A-D.

FIGS. 2-5 show four examples of an air supply unit 100 that can be used in the mattress system 1 of FIG. 1, each employing different techniques to simultaneously generate multiple streams of air at different pressure levels and/or volumetric flow rates. It should be understood that these embodiments are exemplary, and that each embodiment is not intended to be particularly limited to the features shown and described in connection therewith. That is, certain features of one embodiment may be combined or used in connection with another embodiment. For example, the embodiments of FIGS. 3-5 may each use a multi-speed compressor 110A as shown in FIG. 2. Additionally, each of the embodiments shown in FIGS. 2, 3, and 5 may utilize a single air reservoir with two output ports operated by pressure dropping valves. Further, the embodiment of FIG. 5 may employ a dual compressor device 110B as shown in FIG. 3. Further, as discussed above, each of the air supply units shown herein can be used in other systems that may not be specifically limited to the mattresses shown in FIG. 1.

Figure 6:
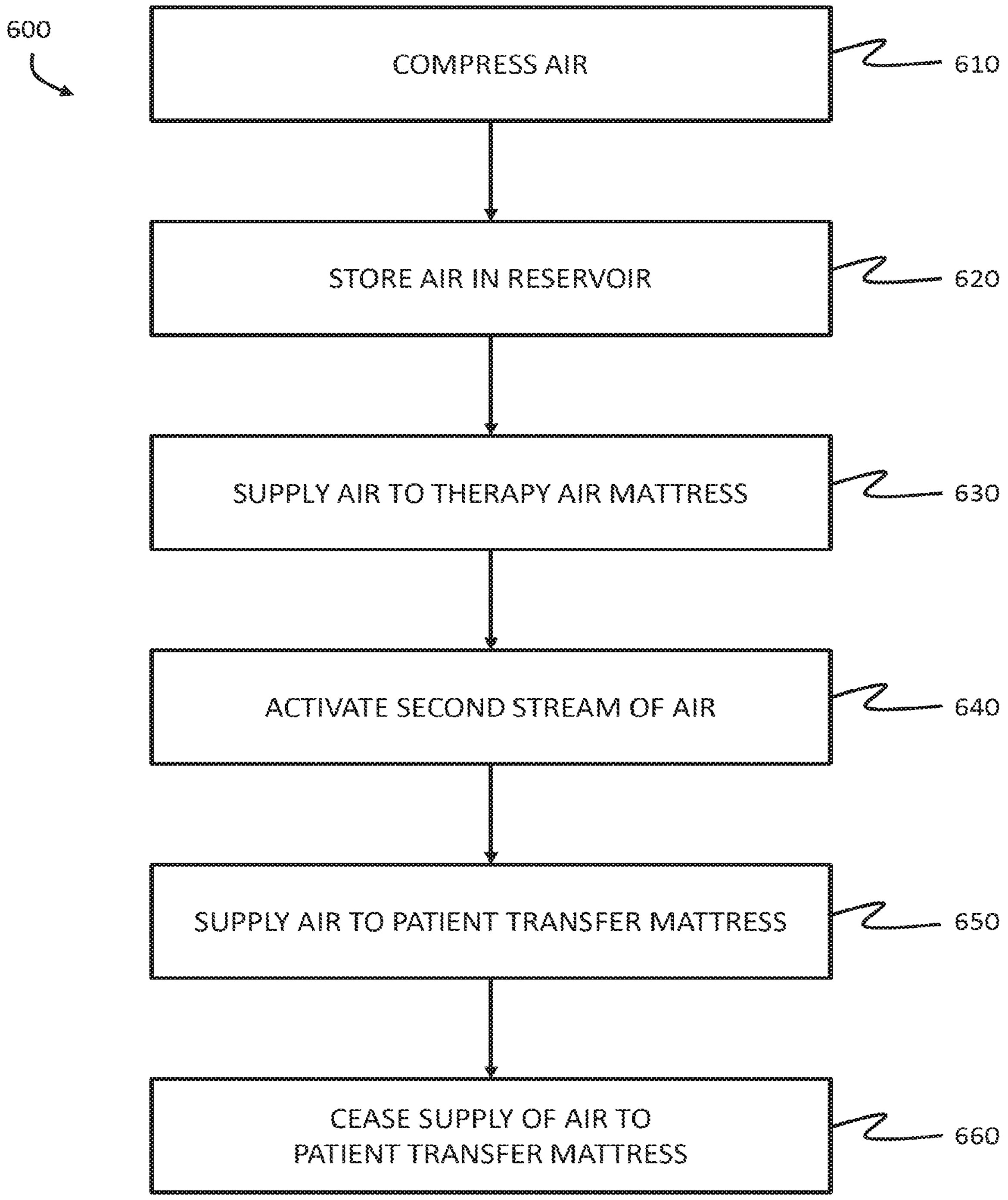
FIG. 6 is a flow diagram of a method in accordance with examples described in this application.

This application also describes methods of suppling air to a plurality of inflatable devices. FIG. 6 is a flow diagram of a method 600 of supplying air to two separate inflatable devices (in the depicted embodiment, the two inflatable devices include a therapy air mattress and a patient transfer mattress). The method 600 involves compressing 610 or pumping air (e.g., with an air compressor device or a plurality of air compressors). The compressed air may be stored 620 in an air in an air reservoir (or in a plurality of reservoirs or reservoir subparts). In some methods, air is stored in one or more of the reservoirs at a reduced pressure level, by way of intermediary pressure control valves in line between the compressor and the reservoir.

Air is then supplied 630 from the reservoirs (or in some cases, from the compressor directly) in a steady stream from the air supply to a therapy mattress. The air is supplied at a first pressure level or volumetric flow rate within a first pressure or flow rate range that is configured to allow the therapy mattress to maintain a consistent (or near consistent)

internal pressure, or so as not to perturb a patient resting on the mattress. The flow rate is also sufficient to allow the therapy air mattress to release a steady flow of air through release ports on an upper surface of the therapy mattress.

An operator may activate 640 a dual supply mode, whereby a second stream of air from the air supply is delivered to a patient transfer mattress. The dual supply mode may be activated 640 in a variety of forms. For example, a user may activate 640 a dual supply mode by turning on a switch on the air supply, by executing a command from a remote device, by selecting a function on a user interface associated with the air supply, by plugging in a conduit into the air supply, or by releasing a valve or nozzle attached to a conduit associated with the second stream of air.

In response to the activation of the dual supply mode, the air supply will then supply 650 a second stream of air to a second inflatable device (e.g., to the patient transfer mattress so that the patient transfer mattress can generate an air cushion). The second stream of air can be at a different pressure level or flow rate, or within a different pressure/flow rate range from the air supplied to the first inflatable device/therapy air mattress. In some methods, the second stream of air may not be directly introduced to an inflatable device, and may simply include generating a burst of air from a nozzle or similar device.

In some examples, the method 600 may also include ceasing 660 the supply of air to the patient transfer mattress. For example, a user may cease 660 air supply to the patient transfer mattress by way of a switch, by unplugging a conduit from the air supply, by closing a valve, or by entering a command via a user interface. Throughout the process, of activating 640 the second stream, supplying 650 the second stream of air, and ceasing 660 the second stream of air to the patient transfer mattress, the air supply may continue to supply air to the therapy air mattress at a steady and/or consistent pressure level, even if the pressure level differs from that supplied to the patient transfer mattress.

The air supply examples described in this application are presented as being used in connection with specific inflatable mattresses; however, it should be appreciated that the air supply can be used in connection with and other systems and devices as well. For example, some versions of the air supply 100 could be used in any situation where a steady supply of air is needed for a first task (e.g., to provide cooling effects, to inflate decorative or promotional displays, to inflate children's toys, etc.), and where a second stream of air may also be needed on demand, such as to inflate objects (tires, balls, toys, etc.), to supply a blast of air (e.g., in shop blowers, dental or medical air tools), and other similar situations.

Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. An air supply comprising:

an air compressing device;

a first pressure valve; and a second pressure valve;

wherein the air supply is operable to continuously introduce air from the first pressure valve to a first inflatable device at a first pressure within a first air pressure range to maintain a generally consistent internal pressure while the first inflatable device releases air therefrom, and, on demand, to introduce air from the second pressure valve to a second inflatable device at a second pressure within a second air pressure range while continuing to supply air to the first inflatable device at a pressure within the first air pressure range, the second pressure being different from the first pressure, the air compressing device comprising a first compressor and a second compressor each contained within a housing, the first compressor fluidically coupled to the first pressure valve and the second compressor fluidically coupled to the second pressure valve.

2. The air supply of claim 1, comprising an air reservoir assembly, the air reservoir assembly comprising a first air reservoir in fluid communication with the air compressing device and the first pressure valve, and a second air reservoir in fluid communication with the air compressing device and the second pressure valve.

3. The air supply of claim 1, comprising:

an air reservoir in communication with the air compressing device, the air reservoir having a first reservoir outlet and a second reservoir outlet;

the first pressure valve being in fluidic communication with the first reservoir outlet, the first pressure valve further configured to control the pressure at which the first reservoir outlet supplies air; and the second pressure valve being in fluidic communication with the second reservoir outlet, the second pressure valve further configured to control the pressure at which the second reservoir outlet supplies air.

4. The air supply of claim 1, comprising:

a first air reservoir in fluid communication with the first pressure valve;

a second air reservoir in fluid communication with the second pressure valve; and a third pressure valve in communication with the air compressing device and the first air reservoir and controlling introduction of air into the first air reservoir; and a fourth pressure valve in communication with the air compressing device and the second air reservoir and controlling the introduction of air into the second air reservoir.

5. The air supply of claim 1, wherein the first pressure is a pressure suitable for a therapy mattress having at least one air release port that releases air from within the therapy mattress at a controlled rate, and wherein the first pressure is configured to maintain a consistent internal air pressure within the therapy mattress.

6. The air supply of claim 1, wherein the second pressure is a pressure suitable for a patient transfer mattress having at least one air cushion port configured to release air at an air pressure level sufficient to at least partially lift the patient transfer mattress off of a resting surface.

7. An air mattress system comprising:

an air compressing device;

a first pressure valve; and a second pressure valve;

a therapy air mattress having release ports that maintain a controlled release of air;

a patient transfer mattress having cushion outlets on an underside of the patient transfer mattress that release air to form an air cushion;

wherein the air compressing device is operable to introduce air from the first pressure valve to the therapy air mattress at a first volumetric flow rate within a first volumetric flow rate range, and, on demand, to introduce air from the second pressure valve to the patient transfer mattress at a second volumetric flow rate within a second volumetric flow rate range while continuing to supply air to the therapy air mattress at a volumetric flow rate within the first volumetric flow rate range, the patient transfer mattress thereby releasing air through the cushion outlets to generate the air cushion, the air cushion providing sufficient lift to reduce the force of friction between the patient transfer mattress and a resting surface, the air compressing device comprising a first compressor and a second compressor each contained within a housing, the first compressor fluidically coupled to the first pressure valve and the second compressor fluidically coupled to the second pressure valve.

8. The air mattress system of claim 7, comprising a first conduit establishing a fluid communication between the first pressure valve and the therapy air mattress and a second conduit establishing a fluid communication between the second pressure valve and the patient transfer mattress.

9. The air mattress system of claim 7, the second volumetric flow rate being different from the first volumetric flow rate.

10. A method comprising:

supplying air from a first air source to a therapy mattress at a first volumetric flow rate within a first volumetric flow rate range thereby releasing air through release ports on an upper surface of the therapy mattress; and supplying air from a second air source to a patient transfer mattress at a second volumetric flow rate within a second volumetric flow rate range, the second volumetric flow rate being different from the first volumetric flow rate, the patient transfer mattress thereby releasing air through cushion outlets to generate an air cushion sufficient to reduce the force of friction between the patient transfer mattress and a resting surface while maintaining the flow of air to said therapy air mattress at a volumetric flow rate within the first volumetric flow rate range, wherein the first air source comprises a first compressor and the second air source comprises a second compressor, and wherein the first and second compressors are contained within a housing, the first compressor fluidically coupled to the therapy mattress and the second compressor fluidically coupled to the patient transfer mattress.

11. The method of claim 10 wherein the second air source is configured to introduce air to the patient transfer mattress in response to a conduit of the patient transfer mattress being connected to the second air source.

12. The method of claim 10 further comprising a first pressure valve fluidically between the first air source and the therapy mattress, a second pressure valve fluidically between the second air source and the patient transfer mattress, the method further comprising:

controlling, at the first pressure valve, the first volumetric flow rate at which the first air source supplies air to the therapy mattress; and controlling, at the second pressure valve, the second volumetric flow rate at which the second air source supplies air to the patient transfer mattress.

* * * * *